(12) United States Patent
Kondo

(10) Patent No.: US 12,722,506 B2
(45) **Date of Patent: *Sep. 1, 2026**

(54) POWER TRANSMISSION DEVICE WITH PHASE COMPENSATION OF TARGET VOLTAGE CONTROL BASED ON TYPE OF POWER RECEPTION DEVICE

(71) Applicant: HONDA MOTOR CO., LTD., Tokyo (JP)

(72) Inventor: Seiichiro Kondo, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 19/060,798

(22) Filed: Feb. 24, 2025

(65) Prior Publication Data

US 2025/0289327 A1 Sep. 18, 2025

(30) Foreign Application Priority Data

Mar. 18, 2024 (JP) ................................ 2024-041922

(51) Int. Cl.
*B60L 53/122* (2019.01)
*B60L 53/66* (2019.01)
(Continued)

(52) U.S. Cl.
CPC ............ *B60L 53/122* (2019.02); *B60L 53/66* (2019.02); *H02J 50/12* (2016.02); *H02J 50/80* (2016.02); *B60L 53/62* (2019.02); *B60L 55/00* (2019.02)

(58) Field of Classification Search
CPC .. H02J 50/10–12; H02J 50/80; H02J 7/00032; H02J 7/00034; H02J 7/00036;
(Continued)

(56) References Cited

U.S. PATENT DOCUMENTS 9,987,937 B1 * 6/2018 Mohamed .............. H02J 50/12
2014/0132212 A1 5/2014 Ichikawa et al.
(Continued)

FOREIGN PATENT DOCUMENTS

CN 112346345 A 2/2021
CN 114362388 B * 11/2023 ............. H02J 50/12
(Continued)

OTHER PUBLICATIONS

English machine translation of CN114362388B published Nov. 10, 2023 (Year: 2023).*
(Continued)

*Primary Examiner* — Rexford N Barnie
*Assistant Examiner* — David A Shiao
(74) *Attorney, Agent, or Firm* — Paratus Law Group, PLLC

(57) ABSTRACT

A power transmission device has a power transmission unit which transmits power to a power reception device by contactless power transmission, a power conversion unit which supplies power to the power transmission unit, and a control unit which acquires information about a terminal voltage of a power supply unit charged with power received by the power reception device and controls the power conversion unit. The control unit acquires type information indicating a type of a power reception device, acquires control information corresponding to the power reception device based on the type information from a storage unit that stores control information required for each type of the power reception device, and executes power feeding control for controlling supply power via the power conversion unit such that the terminal voltage comes to a target voltage, based on the acquired control information.

4 Claims, 6 Drawing Sheets

(51) Int. Cl.

| | |
|---|---|
| ***H02J 50/12*** | (2016.01) |
| ***H02J 50/80*** | (2016.01) |
| *B60L 53/62* | (2019.01) |
| *B60L 55/00* | (2019.01) |

(58) Field of Classification Search

CPC .... H02J 7/00045; H02J 7/40–47; H02J 3/322; B60L 53/12–126; B60L 53/66–665; B60L 55/00

See application file for complete search history.

(56) References Cited

U.S. PATENT DOCUMENTS

| | | | | |
|---|---|---|---|---|
| 2016/0352139 | A1* | 12/2016 | Takatsu | H02J 7/04 |
| 2017/0305282 | A1* | 10/2017 | Obayashi | B60L 53/122 |
| 2020/0076244 | A1* | 3/2020 | Smith | G01K 7/42 |
| 2021/0399583 | A1* | 12/2021 | Nakanishi | H02M 7/219 |
| 2022/0037926 | A1 | 2/2022 | Omori et al. | |
| 2022/0250487 | A1 | 8/2022 | Mao et al. | |
| 2022/0337093 | A1* | 10/2022 | Draak | H02J 50/80 |
| 2023/0067135 | A1 | 3/2023 | Omori et al. | |
| 2023/0182610 | A1 | 6/2023 | Matsushita et al. | |
| 2024/0048002 | A1 | 2/2024 | Lebens et al. | |

FOREIGN PATENT DOCUMENTS

| | | | | |
|---|---|---|---|---|
| JP | 2013-005615 A | 1/2013 | | |
| JP | 2021-035077 A | 3/2021 | | |
| JP | 2023-500133 A | 1/2023 | | |
| JP | 2023-020323 A | 2/2023 | | |
| JP | 2023-087488 A | 6/2023 | | |
| JP | 2023-554039 A | 12/2023 | | |
| WO | WO 2015/104779 A1 | 7/2015 | | |
| WO | WO-2019001818 A1 * | 1/2019 | | H02J 50/80 |
| WO | WO-2024233648 A1 * | 11/2024 | | H02J 50/12 |

OTHER PUBLICATIONS

Sep. 30, 2025, Translation of Japanese Office Action issued for related JP Application No. 2024-041922.

Nawata, Research on Coupling Coefficient Estimation during Constant Input Power Operation of Magnetic Field Resonance Coupling Wireless Power Transmission, Master's Thesis of the Department of Advanced Energy Engineering, Graduate School of Frontier Sciences, University of Tokyo, Apr. 15, 2022, pp. 19-21, Shusoiki No. 7473.

May 7, 2025, Translation of Japanese Office Action issue for related JP Application No. 2024-041922.

* cited by examiner 100
10
VEHICLE-MOUNTED DEVICE
11
12
RESO-NANT CIRCUIT
13
FIRST POWER CONVER-SION CIRCUIT
14
FILTER
15
V
17
BAT
20
VEHICLE-SIDE CONTROL UNIT
18
FIRST COM-MUNICATION UNIT
30
POWER SUPPLY DEVICE
31
32
RESO-NANT CIRCUIT
33
SECOND POWER CONVER-SION CIRCUIT
34
35
V
36
THIRD POWER CONVER-SION CIRCUIT
37
SECOND COMMUNICA-TION UNIT
40
POWER SUPPLY-SIDE CONTROL UNIT
50
SERVER
51
STORAGE UNIT
60
NETWORK

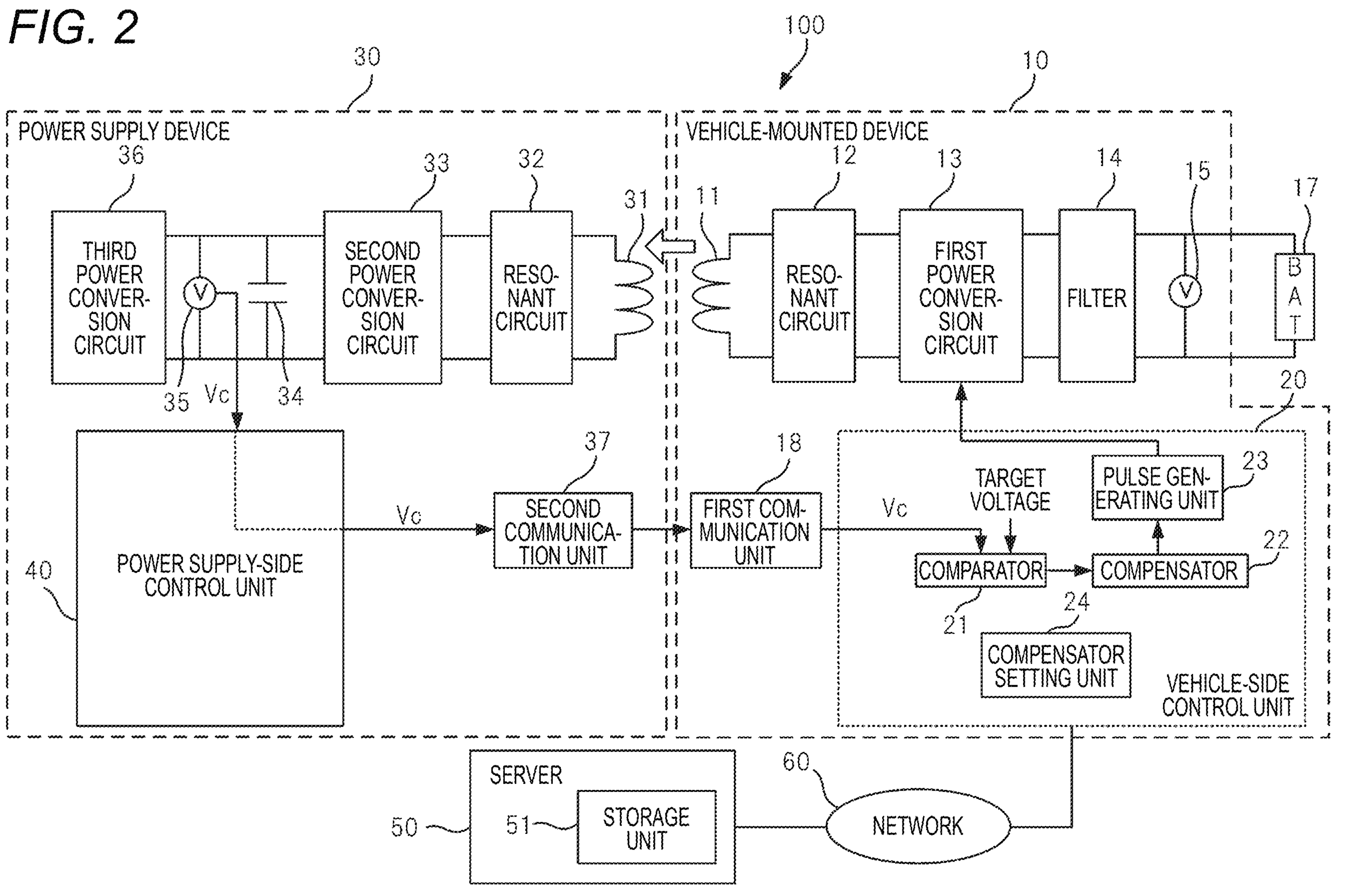
FIG. 2
30
100
10
POWER SUPPLY DEVICE
VEHICLE-MOUNTED DEVICE
36
33
32
31
11
12
13
14
15
17
THIRD POWER CONVER-SION CIRCUIT
SECOND POWER CONVER-SION CIRCUIT
RESO-NANT CIRCUIT
RESO-NANT CIRCUIT
FIRST POWER CONVER-SION CIRCUIT
FILTER
V
V
BAT
35
Vc
34
20
37
18
23
SECOND COMMUNICA-TION UNIT
FIRST COM-MUNICATION UNIT
Vc
Vc
TARGET VOLTAGE
PULSE GEN-ERATING UNIT
40
POWER SUPPLY-SIDE CONTROL UNIT
COMPARATOR
COMPENSATOR
22
21
24
COMPENSATOR SETTING UNIT
VEHICLE-SIDE CONTROL UNIT
SERVER
60
50
51
STORAGE UNIT
NETWORK

FIG. 3

| POWER SUPPLY DEVICE TYPE | TRANSFER FUNCTION INFORMATION | | | SETTING INFORMATION | | | |
|---|---|---|---|---|---|---|---|
| | Pole,zero | DC gain | other | SETTING MODE | P ITEM | I ITEM | D ITEM |
| COMPANY A, TYPE ○○ | 2pole 1zero | ○○dB@~Hz | OUTPUT CURRENT: ○ A OR MORE | PID | ○.○○ | ○.○○ | ○.○○ |
| | 2pole 1zero | ●●dB@~Hz | OUTPUT CURRENT: LESS THAN ○ A | PID | ●.●● | ●.●● | ●.●● |
| COMPANY B, TYPE ×× | 3pole 1zero | ××dB@~Hz | | 1pole2zero | ×.×× | ×.×× | ×.×× |
| COMPANY C, TYPE ΔΔ | 2pole 2zero | ΔΔdB@~Hz | | Type2 | Δ.ΔΔ | Δ.ΔΔ | Δ.ΔΔ |

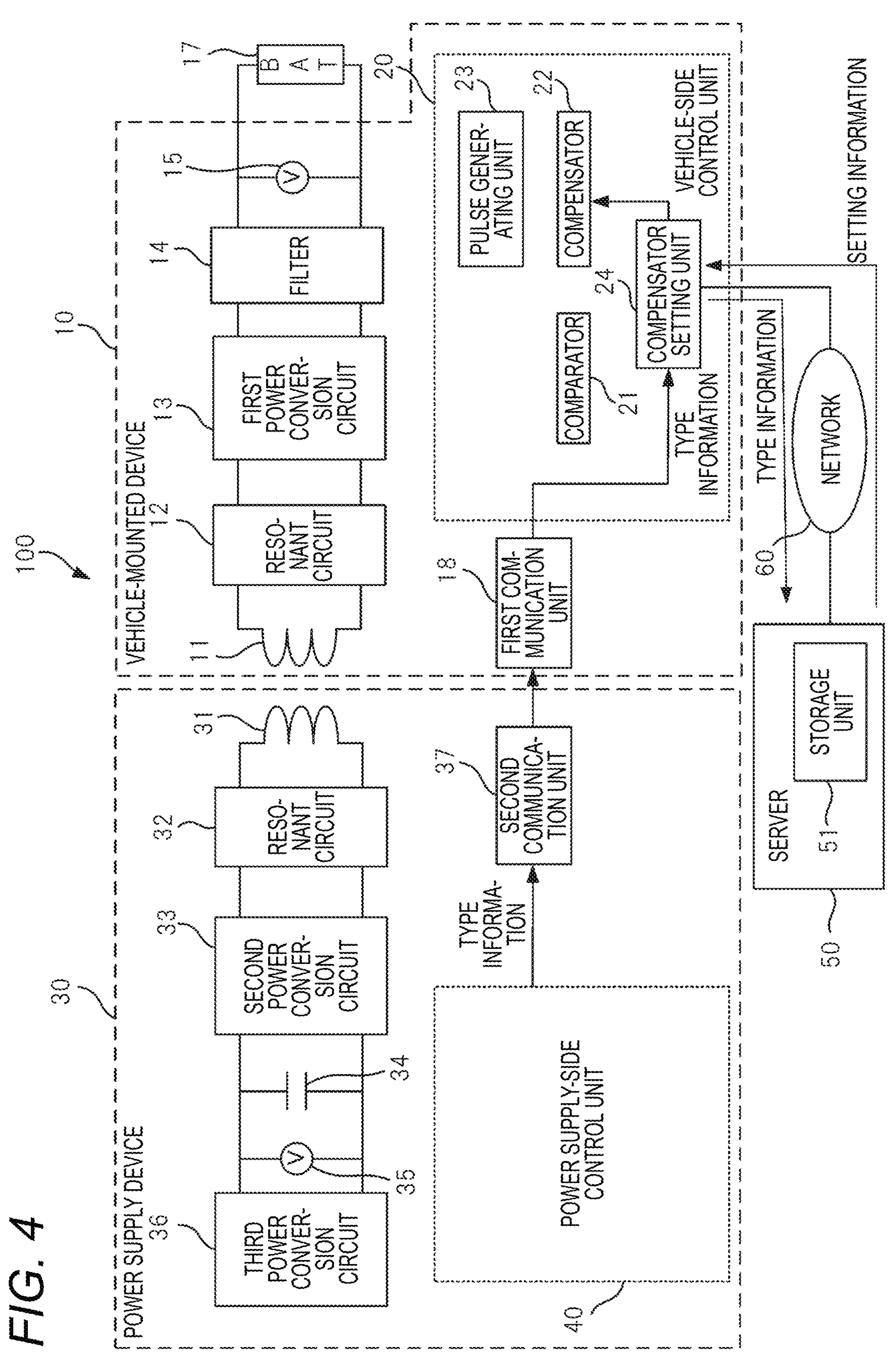
FIG. 4
100
10
VEHICLE-MOUNTED DEVICE
11
12
RESO-NANT CIRCUIT
13
FIRST POWER CONVER-SION CIRCUIT
14
FILTER
15
V
17
BAT
20
23
PULSE GENER-ATING UNIT
22
COMPENSATOR
VEHICLE-SIDE CONTROL UNIT
24
COMPENSATOR SETTING UNIT
COMPARATOR
21
TYPE INFORMATION
18
FIRST COM-MUNICATION UNIT
TYPE INFORMATION
SETTING INFORMATION
NETWORK
60
SERVER
STORAGE UNIT
51
50
30
POWER SUPPLY DEVICE
31
32
RESO-NANT CIRCUIT
33
SECOND POWER CONVER-SION CIRCUIT
34
35
36
THIRD POWER CONVER-SION CIRCUIT
37
SECOND COMMUNICA-TION UNIT
TYPE INFORMA-TION
POWER SUPPLY-SIDE CONTROL UNIT
40

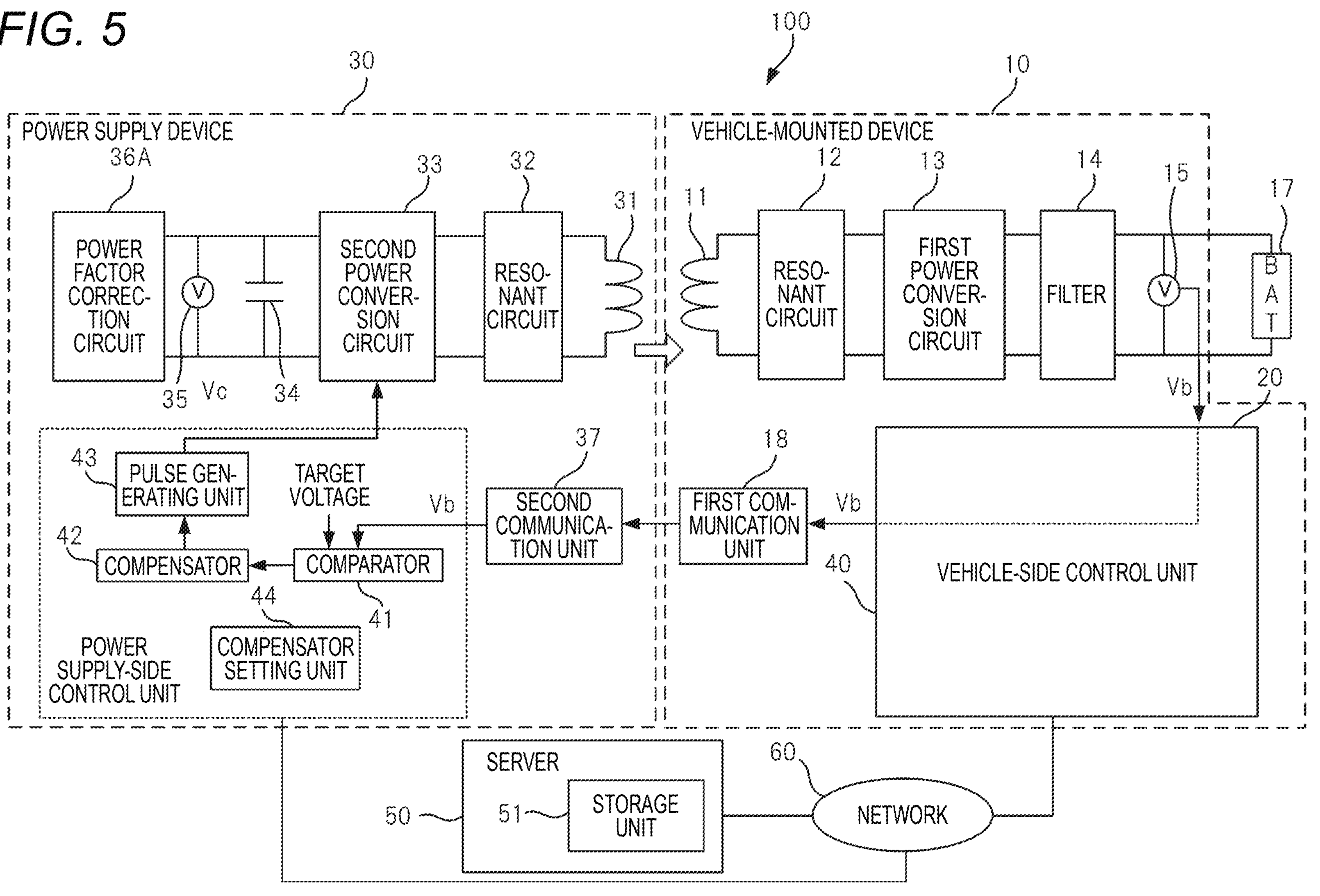
FIG. 5
100
30
POWER SUPPLY DEVICE
36A
POWER FACTOR CORREC-TION CIRCUIT
35
Vc
34
33
SECOND POWER CONVER-SION CIRCUIT
32
RESO-NANT CIRCUIT
31
10
VEHICLE-MOUNTED DEVICE
11
12
RESO-NANT CIRCUIT
13
FIRST POWER CONVER-SION CIRCUIT
14
FILTER
15
17
BAT
Vb
20
43
PULSE GEN-ERATING UNIT
TARGET VOLTAGE
Vb
42
COMPENSATOR
COMPARATOR
44
41
POWER SUPPLY-SIDE CONTROL UNIT
COMPENSATOR SETTING UNIT
37
SECOND COMMUNICA-TION UNIT
18
FIRST COM-MUNICATION UNIT
Vb
40
VEHICLE-SIDE CONTROL UNIT
SERVER
50
51
STORAGE UNIT
60
NETWORK

FIG. 6

| VEHICLE-MOUNTED DEVICE TYPE | TRANSFER FUNCTION INFORMATION | | | SETTING INFORMATION | | | |
|---|---|---|---|---|---|---|---|
| | Pole,zero | DC gain | other | SETTING MODE | P ITEM | I ITEM | D ITEM |
| COMPANY A, TYPE ○○ | 2pole 1zero | ○○dB@~Hz | OUTPUT CURRENT: ○ A OR MORE | PID | ○.○○ | ○.○○ | ○.○○ |
| | 2pole 1zero | ●●dB@~Hz | OUTPUT CURRENT: LESS THAN ○ A | PID | ●.●● | ●.●● | ●.●● |
| COMPANY B, TYPE ×× | 3pole 1zero | ××dB@~Hz | | 1pole2zero | ×.×× | ×.×× | ×.×× |
| COMPANY C, TYPE ΔΔ | 2pole 2zero | ΔΔdB@~Hz | | Type2 | Δ.ΔΔ | Δ.ΔΔ | Δ.ΔΔ |

POWER TRANSMISSION DEVICE WITH PHASE COMPENSATION OF TARGET VOLTAGE CONTROL BASED ON TYPE OF POWER RECEPTION DEVICE

CROSS-REFERENCE TO RELATED APPLICATIONS

This application is based on and claims priority under 35 USC 119 from Japanese Patent Application No. 2024-041922 filed on Mar. 18, 2024, the entire content of which is incorporated herein by reference.

TECHNICAL FIELD

The technique of the present disclosure relates to a power transmission device.

BACKGROUND ART

In recent years, researches and developments have been conducted on charging and power feeding in a vehicle mounted with a secondary battery that contributes to an increase in energy efficiency in order to allow more users to access affordable, reliable, sustainable, and advanced energy.

For example, as researches and developments related to charging and power feeding, researches and developments related to contactless power transmission in which power is contactlessly transmitted between two devices have been conducted.

JP2013-005615A discloses a power reception device for contactlessly receiving power transferred from a power transmission device by electromagnetic resonance.

JP2023-020323A describes a moving object capable of contactlessly receiving power from an external power transmission device.

JP2023-500133A describes a wireless charging receiving end including a receiver coil, a compensation network, a power converter, and a receiving end controller.

WO2015/104779A describes a contactless power feeding device including a power feeding device and a power reception device, in which the power feeding device includes an inverter, a primary coil, and a power-feeding-side resonant circuit provided between the inverter and the primary coil, and the power reception device includes a secondary coil magnetically coupled to the primary coil and configured to acquire energy from the primary coil, and generates output power by converting the energy acquired by the secondary coil into a voltage.

SUMMARY OF INVENTION

An object of the technique of the present disclosure is to perform optimum power transmission control even for each of power reception devices of different types.

An aspect of the present disclosure relates to a power transmission device including:

- a power transmission unit configured to transmit power to a power reception device by contactless power transmission;
- a power conversion unit configured to generate supply power to be supplied to the power transmission unit using power of a first power supply unit, and supply the supply power to the power transmission unit; and
- a control unit configured to be allowed to acquire information about a terminal voltage of a second power supply unit charged with power received by the power reception device and control the power conversion unit, and configured to execute power feeding control for controlling the supply power via the power conversion unit such that the terminal voltage comes to a target voltage, in which the power feeding control includes phase compensation for adjusting a phase characteristic of a system that charges the second power supply unit, and the control unit is configured to:

- acquire type information indicating a type of a power reception device to which power is to be transmitted,
- acquire control information corresponding to the power reception device to which the power transmission device transmits power, based on the type information, from a storage unit that stores control information required for the phase compensation for each type of the power reception device; and
- perform the phase compensation based on the acquired control information.

According to the aspect of the present disclosure, it is possible to perform optimum power transmission control even for each of power reception devices of different types.

BRIEF DESCRIPTION OF DRAWINGS

Exemplary embodiment(s) of the present invention will be described in detail based on the following figures, wherein:

FIG. 2 is a schematic diagram illustrating an operation state of the contactless power transmission system 100 during execution of power feeding control by a vehicle-mounted device 10;

FIG. 3 is a schematic diagram illustrating an example of information that is stored in a storage unit 51 of a server 50 and is used during first power transmission;

FIG. 4 is a schematic diagram illustrating an operation state of the contactless power transmission system 100 before power feeding control is started;

FIG. 5 is a schematic diagram illustrating a configuration of the contactless power transmission system 100 when second power transmission is performed; and FIG. 6 is a schematic diagram illustrating an example of information that is stored in the storage unit 51 of the server 50 and is used during second power transmission.

DESCRIPTION OF EMBODIMENTS

Figure 1:
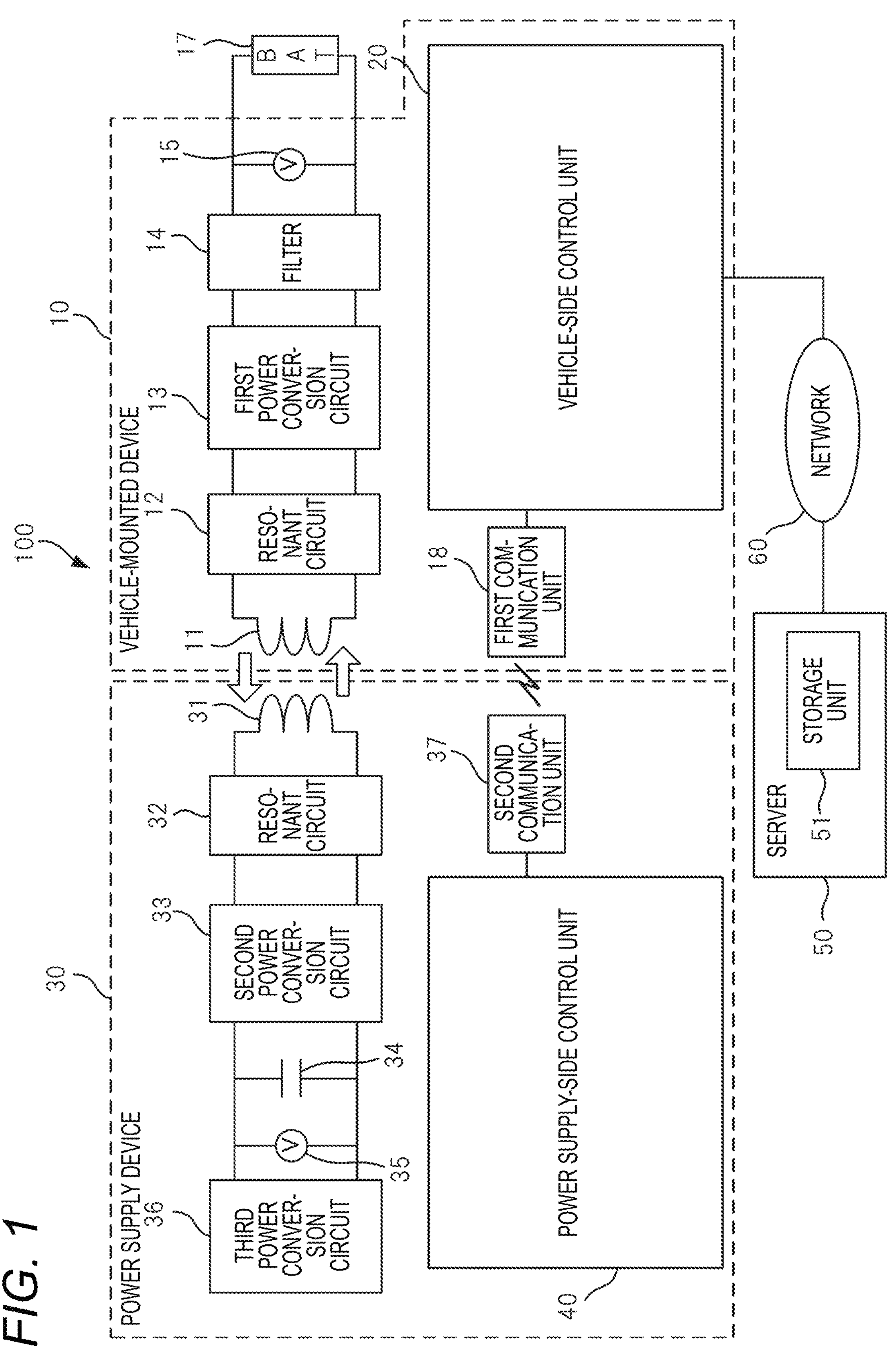
FIG. 1 is a schematic diagram illustrating a contactless power transmission system 100 according to an embodiment of the technique of the present disclosure.

FIG. 1 is a schematic diagram illustrating a contactless power transmission system 100 according to an embodiment of the technique of the present disclosure. The contactless power transmission system 100 includes a vehicle-mounted device 10 mounted on a vehicle or the like, a power supply device 30 provided at a place (a parking lot, a commercial facility, a house, or the like) where the vehicle including the vehicle-mounted device 10 can be parked, and a server 50 connected to a network 60 such as the Internet. The server 50 is provided with a storage unit 51 including a storage medium such as a semi-conductor memory or a hard disk. The vehicle-mounted device 10 is configured to connect to the network 60 and communicate with the server 50 via the network 60.

The contactless power transmission system 100 is configured to be able to perform first power transmission from the vehicle-mounted device 10 to the power supply device 30 and second power transmission from the power supply device 30 to the vehicle-mounted device 10. The vehicle-mounted device 10 and the power supply device 30 perform contactless power transmission using magnetic coupling between coils of, for example, a magnetic resonance method or an electromagnetic induction method. During the first power transmission, the vehicle-mounted device 10 constitutes a power transmission device, and the power supply device 30 constitutes a power reception device. During the second power transmission, the vehicle-mounted device 10 constitutes a power reception device, and the power supply device 30 constitutes a power transmission device.

The vehicle on which the vehicle-mounted device 10 is mounted includes a secondary battery 17 (denoted as BAT in the figure) such as a lithium-ion battery or a nickel-hydrogen battery, and includes an electric motor as a drive source driven by power of the secondary battery 17. For example, the vehicle is an automobile including wheels (none illustrated) including drive wheels driven by power of the electric motor and driven wheels that can be steered.

The vehicle-mounted device 10 includes a vehicle-side coil 11, a resonant circuit 12 connected to the vehicle-side coil 11, a first power conversion circuit 13 connected to the resonant circuit 12, a filter 14 provided between the first power conversion circuit 13 and the secondary battery 17, a voltage detection circuit 15 configured to detect a terminal voltage Vb of the secondary battery 17, a first communication unit 18, and a vehicle-side control unit 20.

The resonant circuit 12 includes, for example, a capacitor connected in series to the vehicle-side coil 11. During the first power transmission, the vehicle-side coil 11 and the resonant circuit 12 constitute a power transmission unit that transmits power to the power supply device 30 by contactless power transmission.

During the first power transmission, the first power conversion circuit 13 generates supply power to be supplied to the vehicle-side coil 11 and the resonant circuit 12 using the power of the secondary battery 17, and supplies the supply power to the vehicle-side coil 11 and the resonant circuit 12. The first power conversion circuit 13 includes a switching element such as a transistor, and operates, for example, as an inverter that converts a direct current supplied from the secondary battery 17 into a high-frequency alternating current during the first power transmission. The high-frequency alternating current converted by the first power conversion circuit 13 is input to the vehicle-side coil 11, and a high-frequency alternating current is induced by an electromagnetic induction effect in a power supply-side coil 31 of the power supply device 30 facing the vehicle-side coil 11 with a gap therebetween.

The filter 14 is provided to stabilize power and remove noise.

The first communication unit 18 is an interface for performing near field wireless communication. For the near field wireless communication, for example, Wi-Fi (Registered trademark), Bluetooth (Registered trademark), or the like can be used.

The vehicle-side control unit 20 includes a processor such as a central processing unit (CPU) and a memory, and performs various controls related to power transmission.

The power supply device 30 includes the power supply-side coil 31, a resonant circuit 32 connected to the power supply-side coil 31, a second power conversion circuit 33 connected to the resonant circuit 32, a capacitor 34 connected to the second power conversion circuit 33, a voltage detection circuit 35 configured to detect a terminal voltage Vc of the capacitor 34, a third power conversion circuit 36 connected to the capacitor 34, a second communication unit 37, and a power supply-side control unit 40.

The resonant circuit 32 includes, for example, a capacitor connected in series to the power supply-side coil 31. During the first power transmission, the power supply-side coil 31 and the resonant circuit 32 constitute a power reception unit that receives power transmitted from the vehicle-mounted device 10 by the contactless power transmission.

The second power conversion circuit 33 operates as a rectifier during the first power transmission, and converts a high-frequency alternating current input from the power supply-side coil 31 into a direct current.

The capacitor 34 is charged with the direct current converted by the second power conversion circuit 33. During the first power transmission, the capacitor 34 is configured to be able to supply the stored power to a load connected to the third power conversion circuit 36.

The third power conversion circuit 36 operates as an inverter during the first power transmission, and converts a direct current discharged from the capacitor 34 into an alternating current having a frequency of a commercial power supply. The alternating current having a commercial frequency converted by the third power conversion circuit 36 is supplied to a load such as a power grid or a home appliance.

The second communication unit 37 is an interface for performing near field wireless communication. For the near field wireless communication, for example, Wi-Fi (Registered trademark), Bluetooth (Registered trademark), or the like can be used.

The power supply-side control unit 40 includes a processor such as a central processing unit (CPU) and a memory, and performs overall control on the power supply device 30.

During the second power transmission in which power is transmitted from the power supply device 30 to the vehicle-mounted device 10, the power supply device 30 has a configuration in which the third power conversion circuit 36 is replaced with a power factor correction circuit. In addition, the second power conversion circuit 33 operates as an inverter, and converts the alternating current input from the power factor correction circuit into a high-frequency alternating current suitable for power transmission. The high-frequency alternating current converted by the second power conversion circuit 33 is input to the power supply-side coil 31. Accordingly, the high-frequency alternating current is induced in the vehicle-side coil 11 by the electromagnetic induction effect. The first power conversion circuit 13 of the vehicle-mounted device 10 operates as a rectifier during the second power transmission, and converts a high-frequency alternating current input from the vehicle-side coil 11 into a direct current. The converted direct current is supplied to and stored in the secondary battery 17.

During the first power transmission, the vehicle-side control unit 20 acquires information about the terminal voltage Vc of the capacitor 34 of the power supply device 30, and executes power feeding control for controlling the supply power supplied to the vehicle-side coil 11 and the resonant circuit 12 via the first power conversion circuit 13 such that the terminal voltage Vc comes to a predetermined target voltage.

In this way, during the first power transmission, the vehicle-side control unit 20 uses a system (a charging system including the resonant circuit 12, the vehicle-side coil 11, the power supply-side coil 31, the resonant circuit 32, and the second power conversion circuit 33, which are provided between the first power conversion circuit 13 and the capacitor 34) that charges the capacitor 34 with the power transmitted from the vehicle-mounted device 10 as a control target to control input power (feedback control) of the control target such that an output voltage (synonymous with the terminal voltage Vc) of the control target comes to a target voltage. Hereinafter, a transfer function of the control target is referred to as a transfer function G (s).

FIG. 2 is a schematic diagram illustrating an operation state of the contactless power transmission system 100 during execution of power feeding control by the vehicle-mounted device 10. When the power feeding control is started, the power supply-side control unit 40 acquires information about the terminal voltage Vc from the voltage detection circuit 35 and performs control to transmit the acquired information about the terminal voltage Vc from the second communication unit 37 to the vehicle-mounted device 10. The information about the terminal voltage Vc transmitted from the second communication unit 37 is received by the first communication unit 18 and acquired by the vehicle-side control unit 20.

As illustrated in FIG. 2, the vehicle-side control unit 20 includes a comparator 21, a compensator 22, a pulse generating unit 23, and a compensator setting unit 24. These are configured by hardware, software, or a combination thereof. The comparator 21 compares the terminal voltage Vc acquired by the first communication unit 18 with the target voltage, and outputs a deviation therebetween.

The compensator 22 determines, based on the deviation input from the comparator 21 and various setting values (for example, information on P term, I term, and D term in the case of a PID compensator) for phase compensation set by the compensator setting unit 24, input power to the control target required for optimizing the output of the control target represented by the transfer function G (s) (achieving a state with good responsiveness and no oscillation).

Specifically, the compensator 22 performs phase compensation for adjusting a phase characteristic of the control target, and determines the input power to the control target such that a phase margin between the input and the output of the control target is 0 degrees or more. The pulse generating unit 23 generates a drive pulse and supplies the drive pulse to the first power conversion circuit 13 such that the power output from the first power conversion circuit 13 comes to the input power determined by the compensator 22.

The compensator setting unit 24 acquires a setting value of the compensator 22 such that the phase margin between the input and the output of the control target is 0 degrees or more, and sets the acquired setting value in the compensator 22. If respective values (frequencies) of a pole and a zero in the transfer function G (s) are determined, the setting value of the compensator 22 at which the phase margin between the input and the output of the control target is 0 degrees or more can be determined based on the values. The values of the pole and the zero of the transfer function G (s) constitute one piece of transfer function information related to the transfer function G (s).

The transfer function G (s) may vary depending on the combination of the vehicle-mounted device 10 and the power supply device 30. For example, it is assumed that there is the vehicle-mounted device 10 of a specific type and power is transmitted from the vehicle-mounted device 10 to each of a plurality of types of power supply devices 30 of different types. In this case, the compensator 22 of the vehicle-mounted device 10 needs to be set differently for each type of the power supply device 30.

In the present embodiment, the storage unit 51 of the server 50 stores in advance, for each combination of the vehicle-mounted device 10 and each type of the power supply device 30, information on the transfer function G (s) of the control target determined by the combination and information (hereinafter also referred to as setting information) on the setting value of the compensator 22 corresponding to the transfer function G (s).

FIG. 3 is a schematic diagram illustrating an example of information that is stored in the storage unit 51 of the server 50 and is used during the first power transmission. In the storage unit 51, for each type (three types in the illustrated example) of the power supply device, information (Pole, zero) on the number of poles and zeros of the transfer function G (s) and the frequency, information (DC gain) on the gain of the transfer function G (s), and other information (other) are stored as transfer function information. As an example, in the power supply device 30 of type alpha in Company A, the transfer function G (s) varies depending on an output current value of the control target. In the power supply device 30, the information on the number of poles and zeros and the frequency, and the information on the gain are stored for each output current value.

The storage unit 51 stores, for each of four pieces of transfer function information in the illustrated example, setting information indicating an optimum setting value of the compensator 22 determined by the transfer function information. In the illustrated example, as the setting information, a setting mode of the compensator 22 and information (P term, I term, and D term) of the setting value of the compensator 22 in the setting mode are illustrated. The transfer function information illustrated in FIG. 3 is uploaded from, for example, a supplier of the power supply device 30 to the server 50. The setting information illustrated in FIG. 3 is uploaded from, for example, a supplier of the vehicle-mounted device 10 to the server 50.

FIG. 4 is a schematic diagram illustrating an operation state of the contactless power transmission system 100 before power feeding control is started. The vehicle-side control unit 20 requests the power supply device 30 to transmit type information of the power supply device 30 before the power feeding control is performed, that is, at a timing before the supply power to the vehicle-side coil 11 and the resonant circuit 12 is determined by the comparator 21 and the compensator 22. Upon receiving the request, the power supply-side control unit 40 transmits the type information of its own device to the vehicle-mounted device 10 by the second communication unit 37.

When the type information is acquired from the power supply device 30 by the first communication unit 18, the vehicle-side control unit 20 transmits the type information to the server 50 via the network 60, and requests the server 50 to transmit the setting information corresponding to the type information. Upon receiving the request, the server 50 reads out, from the storage unit 51, the setting information corresponding to the type information received from the vehicle-mounted device 10 and transmits the setting information to the vehicle-mounted device 10.

When the vehicle-side control unit 20 acquires the setting information from the server 50, the vehicle-side control unit 20 inputs the setting information to the compensator setting unit 24. The compensator setting unit 24 sets the compensator 22 based on the input setting information. In a data example illustrated in FIG. 3, since the setting information is the information on the setting value of the compensator 22 itself, the compensator setting unit 24 sets the setting information in the compensator 22 as it is. When the setting of the setting value of the compensator 22 is completed, the vehicle-side control unit 20 starts the power feeding control.

As described above, according to the contactless power transmission system 100, before the start of the power feeding control, the setting information for performing the phase compensation corresponding to the transfer function G (s) determined by the combination of the power supply device 30 and the vehicle-mounted device 10 is transmitted from the server 50 to the vehicle-mounted device 10. In the vehicle-mounted device 10, the supply power during the power feeding control is controlled based on the setting information. Therefore, even when various types of power supply devices 30 are combined with the vehicle-mounted device 10, optimum power transmission control corresponding to the combination with the power supply device 30 can be performed.

The storage unit 51 may store only the transfer function information illustrated in FIG. 3. In this case, the vehicle-side control unit 20 acquires, from the server 50, the transfer function information corresponding to the type information of the power supply device 30 to which the vehicle-mounted device 10 transmits power. The compensator setting unit 24 may generate information on the setting value of the compensator 22 based on the acquired transfer function information and set the generated setting value in the compensator 22. In this way, the capacity of the storage unit 51 is reduced and generation of information to be stored in the storage unit 51 is facilitated, construction cost of the system can be reduced.

FIG. 5 is a schematic diagram illustrating a configuration of the contactless power transmission system 100 when the second power transmission is performed. In an example of FIG. 5, the power supply device 30 is configured to be connectable to the network 60 and to be communicable with the server 50.

When the second power transmission is performed, an alternating current is supplied to the second power conversion circuit 33 from a power grid, a commercial power supply, or the like via a power factor correction circuit 36A instead of the third power conversion circuit 36. The second power conversion circuit 33 converts the alternating current input from the power factor correction circuit 36A into a high-frequency alternating current. The power supply-side control unit 40 includes a comparator 41, a compensator 42, a pulse generating unit 43, and a compensator setting unit 44 corresponding to the comparator 21, the compensator 22, the pulse generating unit 23, and the compensator setting unit 24 in the vehicle-side control unit 20, respectively.

During the second power transmission, the power supply-side control unit 40 acquires the terminal voltage Vb of the secondary battery 17 from the vehicle-mounted device 10, and executes power feeding control for controlling supply power supplied to the power supply-side coil 31 and the resonant circuit 32 via the second power conversion circuit 33 such that the terminal voltage Vb comes to a predetermined target voltage.

In this way, during the second power transmission, the power supply-side control unit 40 uses a system, which charges the secondary battery 17, with the power transmitted from the power grid or the commercial power supply to the vehicle-mounted device 10 as a control target to control input power of the control target such that an output voltage (synonymous with the terminal voltage Vb) of the control target comes to a target voltage.

When the power feeding control by the power supply-side control unit 40 is started, the vehicle-side control unit 20 acquires the terminal voltage Vb from the voltage detection circuit 15 and performs control to transmit the acquired terminal voltage Vb from the first communication unit 18 to the power supply device 30. The terminal voltage Vb transmitted from the first communication unit 18 is received by the second communication unit 37 and acquired by the power supply-side control unit 40.

The comparator 41 compares the terminal voltage Vb acquired by the second communication unit 37 with the target voltage, and outputs a deviation therebetween.

The compensator 42 determines the input power to the control target required for optimizing the output of the control target based on the deviation input from the comparator 41 and various setting values for phase compensation set by the compensator setting unit 44.

Specifically, the compensator 42 performs phase compensation for adjusting the phase characteristic of the control target, and determines the input power to the control target such that a phase margin between the input and the output of the control target is 0 degrees or more. The pulse generating unit 43 generates a drive pulse and supplies the drive pulse to the second power conversion circuit 33 such that the power output from the second power conversion circuit 33 comes to the input power determined by the compensator 42.

The compensator setting unit 44 acquires a setting value of the compensator 42 such that the phase margin between the input and the output of the control target is 0 degrees or more, and sets the acquired setting value in the compensator 42.

FIG. 6 is a schematic diagram illustrating an example of information that is stored in the storage unit 51 of the server 50 and is used during the second power transmission. In the storage unit 51, for each type (three types in the illustrated example) of the vehicle-mounted device, information (Pole, zero) on the number of poles and zeros of the transfer function G (s) and the frequency, information (DC gain) on the gain of the transfer function G (s), and other information (other) are stored as transfer function information. As an example, in the vehicle-mounted device 10 of type alpha in Company A, the transfer function G (s) varies depending on an output current value of the control target. In the vehicle-mounted device 10, the information on the number of poles and zeros and the frequency, and the information on the gain are stored for each output current value.

The storage unit 51 stores, for each of four pieces of transfer function information in the illustrated example, setting information indicating an optimum setting value of the compensator 42 determined by the transfer function information. In the illustrated example, as the setting information, a setting mode of the compensator 42 and information (P term, I term, and D term) of the setting value of the compensator 42 in the setting mode are illustrated. The transfer function information illustrated in FIG. 6 is uploaded from, for example, a supplier of the vehicle-mounted device 10 to the server 50. The setting information illustrated in FIG. 6 is uploaded from, for example, a supplier of the power supply device 30 to the server 50.

The power supply-side control unit 40 requests the vehicle-mounted device 10 to transmit the type information of the vehicle-mounted device 10 before the power feeding control is performed. Upon receiving the request, the vehicle-side control unit 20 transmits the type information of its own device to the power supply device 30 by the first communication unit 18.

When the type information is acquired from the vehicle-mounted device 10 by the second communication unit 37, the power supply-side control unit 40 transmits the type information to the server 50 via the network 60, and requests the server 50 to transmit the setting information corresponding to the type information. Upon receiving the request, the server 50 reads out, from the storage unit 51, the setting information corresponding to the type information received from the power supply device 30 and transmits the setting information to the power supply device 30.

When the power supply-side control unit 40 acquires the setting information from the server 50, the power supply-side control unit 40 inputs the setting information to the compensator setting unit 44. The compensator setting unit 44 sets the compensator 42 based on the input setting information. In the example of FIG. 6, since the setting information is the information on the setting value of the compensator 42 itself, the compensator setting unit 44 sets the setting information in the compensator 42 as it is. When the setting of the setting value of the compensator 42 is completed, the power supply-side control unit 40 starts the power feeding control.

Also in the second power transmission, only the transfer function information illustrated in FIG. 6 may be stored in the storage unit 51. In this case, the power supply-side control unit 40 acquires, from the server 50, the transfer function information corresponding to the type information of the vehicle-mounted device 10 to which the power supply device 30 transmits power. The compensator setting unit 44 may generate information on the setting value of the compensator 42 based on the acquired transfer function information and set the generated setting value in the compensator 42.

In the present description, at least the following matters are described. Although corresponding constituent elements or the like in the embodiment described above are shown in parentheses, the present invention is not limited thereto.

(1) A power transmission device (vehicle-mounted device 10 or power supply device 30) including:

a power transmission unit (vehicle-side coil 11 and resonant circuit 12, or power supply-side coil 31 and resonant circuit 32) configured to transmit power to a power reception device (power supply device 30 or vehicle-mounted device 10) by contactless power transmission;

a power conversion unit (first power conversion circuit 13 or second power conversion circuit 33) configured to generate supply power to be supplied to the power transmission unit using power of a first power supply unit (secondary battery 17 or commercial power supply) and supply the supply power to the power transmission unit; and a control unit (vehicle-side control unit 20 or power supply-side control unit 40) configured to be allowed to acquire information about a terminal voltage (terminal voltage Vc or terminal voltage Vb) of a second power supply unit (capacitor 34 or secondary battery 17) charged with power received by the power reception device and control the power conversion unit, and configured to execute power feeding control for controlling the supply power via the power conversion unit such that the terminal voltage comes to a target voltage, in which the power feeding control includes phase compensation for adjusting a phase characteristic of a system that charges the second power supply unit, and the control unit is configured to:

acquire type information indicating a type of a power reception device to which power is to be transmitted, acquire control information corresponding to the power reception device to which the power transmission device transmits power, based on the type information, from a storage unit (storage unit 51) that stores control information (either setting information or transfer function information) required for phase compensation for each type of the power reception device; and perform the phase compensation based on the acquired control information.

According to (1), it is possible to perform appropriate phase compensation for each of power reception devices of different types. Therefore, optimum power transmission control can be performed between the power reception devices having various circuit configurations.

(2) The power transmission device according to (1), in which the power transmission device is configured to be allowed to communicate with a server (server 50) via a network (network 60), and the storage unit is provided in the server.

According to (2), by using the control information stored in the storage unit of the server, it is unnecessary to apply a design for optimum phase compensation to the power transmission device for each of the power reception devices of different types, and the cost of the power transmission device can be reduced. Since the control information is present in the server, it is possible to continuously update optimum phase compensation setting for a new type of power reception device without changing software of the power transmission device. In addition, even when the power transmission device is damaged or the like, the control information stored in the storage unit can be easily checked, and thus it is possible to grasp what kind of power feeding control has been performed.

(3) The power transmission device according to (2), in which the control unit includes a compensator (compensator 22 or compensator 42) configured to perform the phase compensation, and the control information is information indicating a setting value of the compensator.

According to (3), since it is only necessary to acquire the setting value of the compensator from the server and set the setting value in the compensator, it is possible to reduce the cost and a processing load of the power transmission device.

(4) The power transmission device according to (2), in which the control unit includes a compensator (compensator 22 or compensator 42) configured to perform the phase compensation, the control information is transfer function information related to a transfer function of the system, and the control unit generates information indicating a setting value of the compensator based on the acquired transfer function information.

According to (4), it is possible to simplify the storage unit and reduce construction cost of the system.

(5) The power transmission device according to (4), in which the transfer function information includes information indicating a pole and a zero of the transfer function.

According to (5), it is possible to simplify the storage unit and reduce the construction cost of the system.

(6) The power transmission device (vehicle-mounted device 10) according to any one of (1) to (5), in which the power transmission device is provided in a vehicle having an electric motor as a drive source driven by power of the first power supply unit.

According to (6), the power can be transmitted from the vehicle to a load connected to the power reception device, and it is possible to effectively use surplus power of the vehicle and use vehicle power in the event of a disaster.

(7) The power transmission device (power supply device 30) according to any one of (1) to (5), in which the power transmission device is provided in a place where a vehicle is allowed to be parked, the vehicle having the power reception device and an electric motor as a drive source driven by power of the second power supply unit.

According to (7), the second power supply unit of the vehicle can be appropriately charged.

What is claimed is:

1. A power transmission device comprising:

a power transmission circuit configured to transmit power to a power reception device by contactless power transmission;

a power conversion circuit configured to generate supply power to be supplied to the power transmission circuit using power of a first power supply, and supply the supply power to the power transmission circuit; and a processor configured to acquire information about a terminal voltage of a second power supply charged with power received by the power reception device and control the power conversion circuit, and configured to execute power feeding control for controlling the supply power via the power conversion circuit such that the terminal voltage comes to a target voltage, wherein the power transmission device is configured to communicate with a server via a network, the server having a storage, wherein the power feeding control includes phase compensation for adjusting a phase characteristic of a system that charges the second power supply, and wherein the processor is configured to:

acquire type information indicating a type of a power reception device to which power is to be transmitted;

acquire transfer function information corresponding to the power reception device to which the power transmission device transmits power, based on the type information, the transfer function information being stored in the storage and including information indicating a pole and a zero of a transfer function of the system;

include a compensator that performs the phase compensation based on the acquired transfer function information; and generate information indicating a setting value of the compensator based on the acquired transfer function information.

2. The power transmission device according to claim 1, wherein the power transmission device is provided in a vehicle having an electric motor as a drive source driven by power of the first power supply.

3. The power transmission device according to claim 1, wherein the power transmission device is provided in a place where a vehicle is allowed to be parked, the vehicle having the power reception device and an electric motor as a drive source driven by power of the second power supply.

4. The power transmission device according to claim 1, wherein the compensator determines an input power to the power reception device such that a phase margin between an input and an output of the power reception device is 0 degree or more, and wherein the processor generates information indicating the setting value of the compensator such that the phase margin between the input and the output of the power reception device is 0 degree or more, based on the acquired transfer function information.

* * * * *